United States Patent
Pirog et al.

(10) Patent No.: US 11,500,338 B2
(45) Date of Patent: Nov. 15, 2022

(54) TEST PLATFORM FOR EMBEDDED CONTROL SYSTEM

(71) Applicant: Aversan Inc., Mississauga (CA)

(72) Inventors: Daniel Pirog, Toronto (CA); Timothy Welch, Brantford (CA)

(73) Assignee: Aversan Inc., Mississauga (CA)

( * ) Notice: Subject to any disclaimer, the term of this patent is extended or adjusted under 35 U.S.C. 154(b) by 331 days.

(21) Appl. No.: 16/625,571

(22) PCT Filed: Jul. 12, 2018

(86) PCT No.: PCT/CA2018/050854
§ 371 (c)(1),
(2) Date: Dec. 20, 2019

(87) PCT Pub. No.: WO2019/010581
PCT Pub. Date: Jan. 17, 2019

(65) Prior Publication Data
US 2020/0183337 A1   Jun. 11, 2020

Related U.S. Application Data

(60) Provisional application No. 62/531,992, filed on Jul. 13, 2017.

(51) Int. Cl.
*G05B 13/02* (2006.01)
*G06F 40/143* (2020.01)
(Continued)

(52) U.S. Cl.
CPC .......... *G05B 13/021* (2013.01); *B64D 13/02* (2013.01); *G05B 23/0213* (2013.01); *G06F 40/143* (2020.01); *B64D 2013/0603* (2013.01)

(58) Field of Classification Search
CPC .. G05B 13/021; G05B 23/0213; G05B 17/02; G06F 40/143; B64D 13/02; B64D 2013/0603; B64D 13/06; B64F 5/60
See application file for complete search history.

(56) References Cited

U.S. PATENT DOCUMENTS 9,354,624 B2 *   5/2016   Truscott .................. G05B 17/02
10,387,584 B1 *   8/2019   Popovici .................. G06F 30/20
(Continued)

OTHER PUBLICATIONS

US 8,868,401 B1, 10/2014, Koh et al. (withdrawn)
(Continued)

*Primary Examiner* — Santosh R Poudel

(57) ABSTRACT

In an aspect, a test platform for testing an embedded control system having a plurality of interconnected components is operable to: receive, at run time, configuration data for configuring a system under test ("SUT") representing the embedded control system, the configuration data specifying: which of the components shall be simulated versus hardware-in-the-loop (HIL) components in the SUT; and an inter-component signal mapping that maps input signals to output signals of the specified simulated or HIL components of the SUT; for each of the simulated or HIL components, automatically activate, at run time, a corresponding object code portion for simulating the embedded system component in the test platform or a corresponding object code portion for facilitating communication with the HIL component connected to the test platform, respectively; and automatically map input signals of the activated object code portions to output signals of the activated code portions according to the signal mapping.

18 Claims, 15 Drawing Sheets

(51) Int. Cl.
*B64D 13/02* (2006.01)
*G05B 23/02* (2006.01)
*B64D 13/06* (2006.01)

(56) References Cited

U.S. PATENT DOCUMENTS

| | | |
|---|---|---|
| 2005/0257195 A1 | 11/2005 | Morrow et al. |
| 2006/0282252 A1 | 12/2006 | Ciofli |
| 2007/0044078 A1* | 2/2007 | Cifra ................. G06F 30/20 |
| | | 717/125 |
| 2010/0250220 A1* | 9/2010 | Colmenares .......... G06F 11/261 |
| | | 703/13 |
| 2011/0288840 A1* | 11/2011 | Kropinski ............ G06F 30/15 |
| | | 703/8 |
| 2011/0288841 A1* | 11/2011 | Larsson ................ G05B 17/02 |
| | | 703/8 |
| 2013/0185594 A1* | 7/2013 | Budnik ............... G06F 11/3668 |
| | | 714/38.1 |
| 2017/0019309 A1* | 1/2017 | Mason ................. H04L 41/145 |
| 2018/0060725 A1* | 3/2018 | Groh ..................... G06N 3/08 |
| 2018/0189896 A1* | 7/2018 | Lewis ............. G06Q 10/06311 |

OTHER PUBLICATIONS

"Isasa et al.Hardware In the Loop for VDM-Real Time Modeling of Embedded Systems, IEEE, Jan. 26, 2015, https://ieeexplore.ieee.org/document/7018467" (Year: 2015).*

International Search Report and Written Opinion for PCT/CA2018/050854 dated Sep. 27, 2018.

* cited by examiner

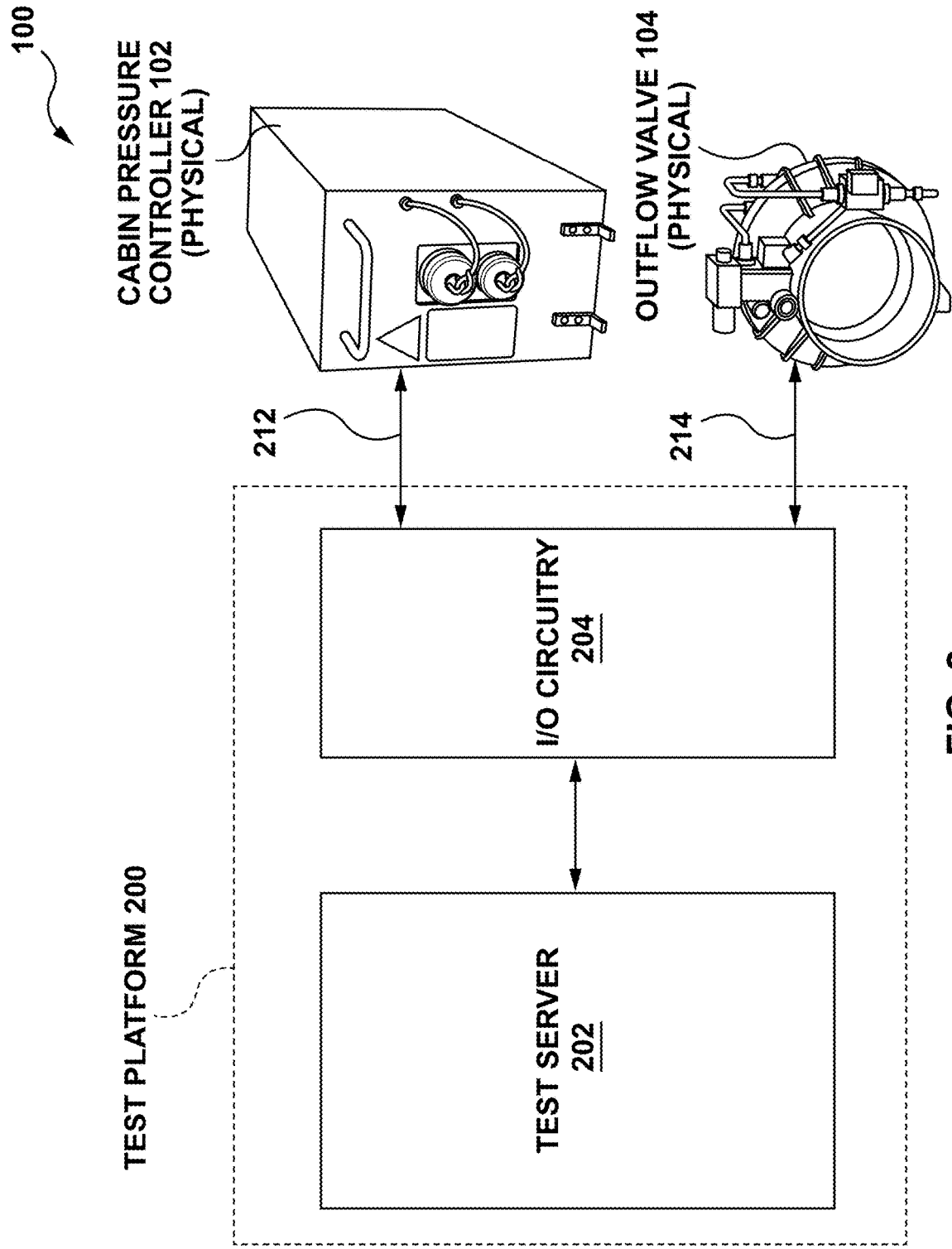

```xml
1  <?xml version="1.0" encoding="utf-8"?>
2  <!-- Configuration File -->
3
4  <Config>
5
6    <Processes>
7    <!-- ==== INSTATIATABLE PROCESSES === -->
8       <Process name = "master" binary = "bin/master" />
9
10      <!-- ======== SIMULATED ============ -->
11      <Process name = "CP" binary = "bin/modelharness"
12        modelSoPath="model/CP.so" />
13      <Process name = "CPC" binary = "bin/modelharness"
14        modelSoPath="model/CPCL.so" />
15      <Process name = "OFV" binary = "bin/modelharness"
16        modelSoPath="model/OFV.so" />
17
18      <!-- ======== HIL ============ -->
19      <!-- <Process name = "CPC-HW" binary = "bin/modelharness"
20        modelSoPath="model/CPCHW.so" /> -->
21      <!-- <Process name = "OFV-HW" binary = "bin/modelharness"
22        modelSoPath="model/OFVHW.so" /> -->
23    </Processes>
24
25    <SignalMaps>
26    <!-- ==== INTER-COMPONENT SIGNAL MAPPING ==== -->
27       <!-- Cabin Pressure Model output to CP Controller model input -->
28       <SignalMap fromSignal="CP.CabinPressure"
29         toSignal="CPC.CabinPressure"/>  (A)
30
31       <!-- Cabin Pressure Controller Model output to Outflow valve
32            model input -->
33       <SignalMap fromSignal="CPC.OFValveCommand"
34         toSignal="OFV.CommandIn"/>  (B)
35
36       <!-- Outflow valve output to Cabin Pressure Model input -->
37       <SignalMap fromSignal="OFV.Position"
38         toSignal="CP.ValvePosition"/>  (C)
39    </SignalMaps>
40
41  </Config>
```

FIG. 6

| SHARED MEMORY 309 | INPUT SIGNALS | | | | OUTPUT SIGNALS | |
|---|---|---|---|---|---|---|
| | Signal Name ("metadata") | Default/Hardcoded Signal Value ("local") | Signal Source ("Pointers") | Current Signal Value ("actuals") | Signal Name ("metadata") | Current Signal Value |
| Cabin Pressure Model "CP" 810 | CP.AirflowIn | 1 kgps | → | | | |
| | CP.ValvePosition | 100% open | → | | | |
| | | | | | CP.CabinPressure | |
| Cabin Pressure Controller Model "CPC" 840 | CPC.AmbientPressure | 1013 mb | → | | | |
| | CPC.CabinPressure | 1013 mb | → | | | |
| | | | | | CPC.OFValveCommand | |
| Out flow Valve Model "OFV" 870 | OFV.CommandIn | 0 RPM | → | | | |
| | | | | | OFV.Position | |
| ... | | | | | | |

FIG. 8

```xml
1  <?xml version="1.0" encoding="utf-8"?>
2  <!-- Configuration File -->
3
4  <Config>
5
6    <Processes>
7    <!-- ==== INSTATIATABLE PROCESSES=== -->
8       <Process name = "master" binary = "bin/master" />
9
10      <!-- ======== SIMULATED =========== -->
11      <Process name = "CP" binary = "bin/modelharness"
12         modelSoPath="model/CP.so" />
13      <!--<Process name = "CPC" binary = "bin/modelharness"
14         modelSoPath="model/CPCL.so" />    -->
15      <!--<Process name = "OFV" binary = "bin/modelharness"
16         modelSoPath="model/OFV.so" />     -->
17
18      <!-- ======== HIL =========== -->
19      <Process name = "CPC-HW" binary = "bin/modelharness"
20         modelSoPath="model/CPCHW.so" />
21      <Process name = "OFV-HW" binary = "bin/modelharness"
22         modelSoPath="model/OFVHW.so" />
23    </Processes>
24
25    <SignalMaps>
26    <!-- ==== INTER-COMPONENT SIGNAL MAPPING ==== -->
27       <!-- Cabin Pressure Model output to CP Controller model input -->
28       <SignalMap fromSignal="CP.CabinPressure"
29          toSignal="CPC-HW.CabinPressure"/>  (D)
30
31       <!--Cabin Pressure Controller Model output to Outflow valve -->
32       <SignalMap fromSignal="CPC-HW.OFValveCommand"
33          toSignal="OFV-HW.CommandIn"/>  (E)
34
35       <!-- Outflow valve output to Cabin Pressure Model input-->
36       <SignalMap fromSignal="OFV-HW.Position"
37          toSignal="CP.ValvePosition"/>  (F)
38    </SignalMaps>
39
40  </Config>
```

FIG. 11

TEST PLATFORM FOR EMBEDDED CONTROL SYSTEM

CROSS-REFERENCE TO RELATED APPLICATIONS

The present application is a national stage entry, under 35 U.S.C. Section 371, of International Application No. PCT/CA2018/050854, filed Jul. 12, 2018, which claims the benefit of prior U.S. provisional application Ser. No. 62/531,992 filed Jul. 13, 2017, the contents of each of which are hereby incorporated by reference hereinto.

TECHNICAL FIELD

The present disclosure relates to test platforms, and more particularly to test platforms for embedded control systems such as environmental control systems.

BACKGROUND

An environmental control system is an embedded control system for controlling an environment within an enclosed space. Environmental control systems typically include sensors, actuators, and at least one controller (each a form of system component). An example of an environment control system is a cabin pressure control system for controlling the air pressure inside an aircraft cabin, e.g. as ambient pressure (air pressure outside the aircraft) varies with altitude.

A cabin pressure control system typically includes a pressure sensor (a form of sensor), an outflow valve (a form of actuator), and a controller. The pressure sensor converts air pressure within the cabin to a corresponding electrical signal. The outflow valve exhausts cabin air to atmosphere or ingresses atmosphere air to the cabin in response to electrical commands. The controller, among other duties, commands the valve to open or close appropriately for achieving a desired cabin pressure based on dynamically sensed parameters (e.g. current cabin pressure, ambient pressure outside the aircraft, current rate of airflow into the cabin, current position of the outflow valve, and/or others). The cabin pressure control system may incorporate other components as well, such as different types of sensors or actuators, or duplicate sensors, actuators, and controllers for use in a failover scenario.

During development of an environmental control system, it is desirable to test the system to ensure that it responds appropriately during various usage scenarios or test cases. Testing is performed using a test platform. The test platform is an apparatus that interconnects with the environmental control system, or components thereof, during testing. The test platform includes a computing device for executing test software that, under the control of a human operator, can be made to run various test procedures, each simulating a usage scenario, and to record system response for verifying proper system functionality.

Testing of an environmental control system is typically performed in stages. Initially, many of the components of the environmental control system may be simulated. This may be due to the unavailability of the components for testing at early stages of environmental control system development. For example, an early test of a cabin pressure control system may simulate each of: signals generated by a pressure sensor during a typical flight; a controller responding to the simulated sensor signals and issuing simulated commands to a simulated actuator (e.g. outflow valve); and the response of the simulated actuator to the commands from the controller, among others.

At later stages of system testing, various ones of the simulated components in the system under test may be progressively replaced by physical components that have now become available. For clarity, a physical component of a system under test that is stimulated during a test is referred to herein as a "hardware-in-the-loop" or HIL component.

Conventional test platforms may be poorly suited for staged testing of environmental control systems or other embedded control systems for various reasons. For example, substitution of a simulated component for an HIL component, or vice-versa, between test runs in a conventional test platform may require physical manipulation of the test platform or system under test (e.g. reconnection of cables) or changes to detailed test procedures. Physical manipulation may introduce new errors, such as faulty connections, which may compromise test results. Similar difficulties could arise if interconnections between input and output signals of system components were physically rearranged in successive test runs. Multiple instances of a conventional test platform could be used to test different combinations of simulated and HIL components to possibly avoid physical manipulation of the test platforms between test runs, but this would disadvantageously increase equipment costs and space requirements. Moreover, any inconsistencies between test platforms risks introducing corresponding inconsistencies between test results recorded by the respective test platforms.

SUMMARY

In one aspect, there is provided a method of configuring a test platform for testing an embedded control system having a plurality of interconnected components, the method comprising: receiving, at run time, configuration data for configuring a system under test representing the embedded control system, the configuration data specifying: which of the components of the embedded control system shall be simulated components in the system under test and which of the components of the embedded control system shall be hardware-in-the-loop (HIL) components, connected to the test platform, in the system under test; and an inter-component signal mapping that maps input signals of the specified simulated or HIL components of the system under test to output signals of the specified simulated or HIL components of the system under test; for each of the simulated components in the system under test, automatically activating, at run time, a corresponding object code portion for simulating the embedded system component in the test platform; for each of the HIL components in the system under test, automatically activating, at run time, a corresponding object code portion in the test platform for facilitating communication with the HIL component connected to the test platform; and automatically mapping input signals of the activated object code portions to output signals of the activated code portions according to the inter-component signal mapping.

In another aspect, there is provided a test platform for testing an embedded control system having a plurality of interconnected components, the test platform comprising: a computing device including: at least one processor; memory, in communication with the at least one processor, storing instructions that, upon execution, cause the at least one processor to: receive, at run time, configuration data for configuring a system under test representing the embedded control system, the configuration data specifying: which of the components of the embedded control system shall be simulated components in the system under test and which of the components of the embedded control system shall be hardware-in-the-loop (HIL) components, connected to the test platform, in the system under test; and an inter-component signal mapping that maps input signals of the specified simulated or HIL components of the system under test to output signals of the specified simulated or HIL components of the system under test; for each of the simulated components in the system under test, automatically activate, at run time, a corresponding object code portion for simulating the embedded system component in the test platform; for each of the HIL components in the system under test, automatically activate, at run time, a corresponding object code portion in the test platform for facilitating communication with the HIL component connected to the test platform; and automatically map input signals of the activated object code portions to output signals of the activated code portions according to the inter-component signal mapping.

In a further aspect, there is provided a non-transitory computer-readable medium storing instructions for configuring a test platform for testing an embedded control system having a plurality of interconnected components, the instructions, when executed by at least one processor of the test platform, causing the at least one processor to: receive, at run time, configuration data for configuring a system under test representing the embedded control system, the configuration data specifying: which of the components of the embedded control system shall be simulated components in the system under test and which of the components of the embedded control system shall be hardware-in-the-loop (HIL) components, connected to the test platform, in the system under test; and an inter-component signal mapping that maps input signals of the specified simulated or HIL components of the system under test to output signals of the specified simulated or HIL components of the system under test; for each of the simulated components in the system under test, automatically activate, at run time, a corresponding object code portion for simulating the embedded system component in the test platform; for each of the HIL components in the system under test, automatically activate, at run time, a corresponding object code portion in the test platform for facilitating communication with the HIL component connected to the test platform; and automatically map input signals of the activated object code portions to output signals of the activated code portions according to the inter-component signal mapping.

In another aspect, a test platform for testing an embedded control system having a plurality of interconnected components is operable to: receive, at run time, configuration data for configuring a system under test ("SUT") representing the embedded control system, the configuration data specifying: which of the components shall be simulated versus hardware-in-the-loop (HIL) components in the SUT; and an inter-component signal mapping that maps input signals to output signals of the specified simulated or HIL components of the SUT; for each of the simulated or HIL components, automatically activate, at run time, a corresponding object code portion for simulating the embedded system component in the test platform or a corresponding object code portion for facilitating communication with the HIL component connected to the test platform, respectively; and automatically map input signals of the activated object code portions to output signals of the activated code portions according to the signal mapping.

Other features are disclosed in the drawings in conjunction with the following description.

BRIEF DESCRIPTION OF THE DRAWINGS

In the figures which illustrate example embodiments:

FIG. 2 is a schematic diagram of a test platform for testing the environmental control system of FIG. 1 according to the desired modes of operation of FIG. 1A;

FIG. 6 is an example configuration file of the test server of FIG. 3 expressed in eXtensible Markup Language (XML);

FIG. 8 is a schematic diagram depicting a portion of shared memory allocated at the test server of FIG. 3;

FIG. 11 is another example configuration file of the test server of FIG. 3 representing a combination of simulated and hardware-in-the-loop components in a system under test;

DETAILED DESCRIPTION

In overview, a test platform for an embedded control system having multiple components receives configuration data at run time. The configuration data, which may take the form of one or more markup language (e.g. XML) files, specifies which components of the embedded control system shall be simulated and which of the components shall be HIL. The configuration data also defines a signal mapping of output signals to input signals between the specified system components.

Based on the configuration data, the test platform reconfigures itself at run time to provide, using any physical component(s) of the interconnected embedded control system needed for the specified configuration, a system under test with the desired mixture of simulated and HIL components and tailored set of interconnections (signal mapping) between components. Test procedures may be conveniently executed for a range of configurations of the system under test. This can be done with little or no physical manipulation of the test platform, without using multiple test platform setups, and without recompiling or relinking test software. The test platform may be used for a variety of different embedded control systems, including but not limited to environmental control systems.

Figure 1:
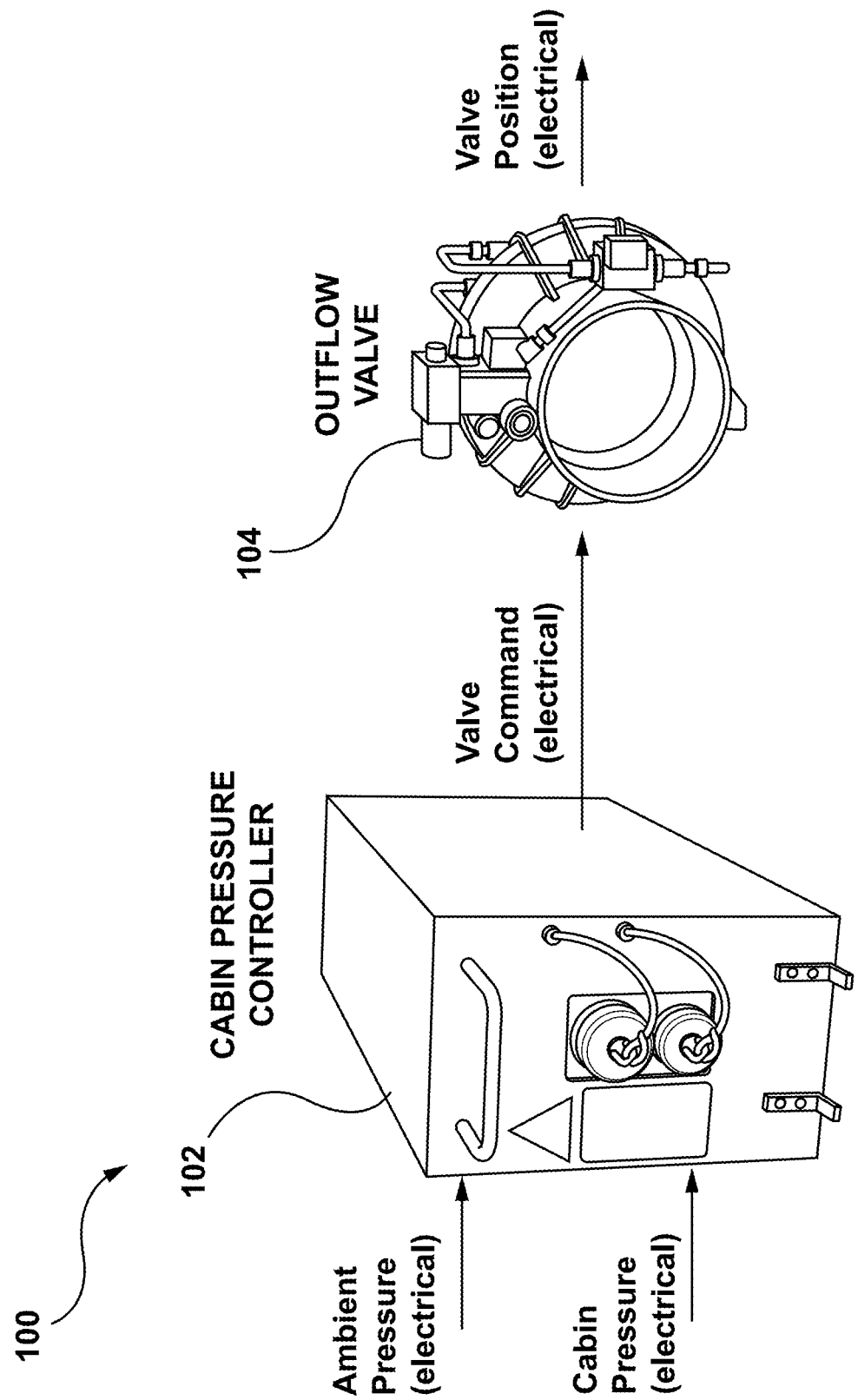
FIG. 1 is a schematic diagram of a simplified environmental control system, a form of embedded control system.

Referring to FIG. 1, a simplified cabin pressure control system 100 (a form of environmental control system) is schematically depicted. The example system 100 includes two physical (hardware) components: a cabin pressure controller (or simply "controller") 102 and an outflow valve (or simply "valve") 104.

The cabin pressure controller 102 is a computing device that is generally responsible for controlling the air pressure within a cabin of an aircraft responsive to a variety of sensed, dynamically changing parameters. It achieves this goal, in part, by opening or closing the outflow valve 104, which governs the rate at which air flows out from the cabin. The controller 102 has inputs for receiving an ambient pressure signal and a cabin pressure signal (each a form of "input signal"). The input signals are electrical signals, e.g. electrical currents output by pressure sensors, that are proportional to a sensed air pressure. The controller 102 also has an output for outputting valve command signals. The valve command signals are also electrical, e.g. conforming to the RS422 standard for example.

The outflow valve 104 is a valve that exhausts cabin air to atmosphere, or in some cases, ingresses atmosphere air to the cabin. The outflow valve 104 has an input for receiving commands causing the valve to open or close in varying degrees, and generates an output signal that is indicative of valve position (i.e. whether the valve is closed, fully open, or somewhere in between). In the illustrated embodiment, the input and output signals are electrical, e.g. conforming to the RS422 standard for example.

The cabin pressure control system 100 may include other components, such as duplicate sensors, actuators, and controllers for use in a failover scenario, but these are omitted from FIG. 1 for simplicity.

Figure 1A:
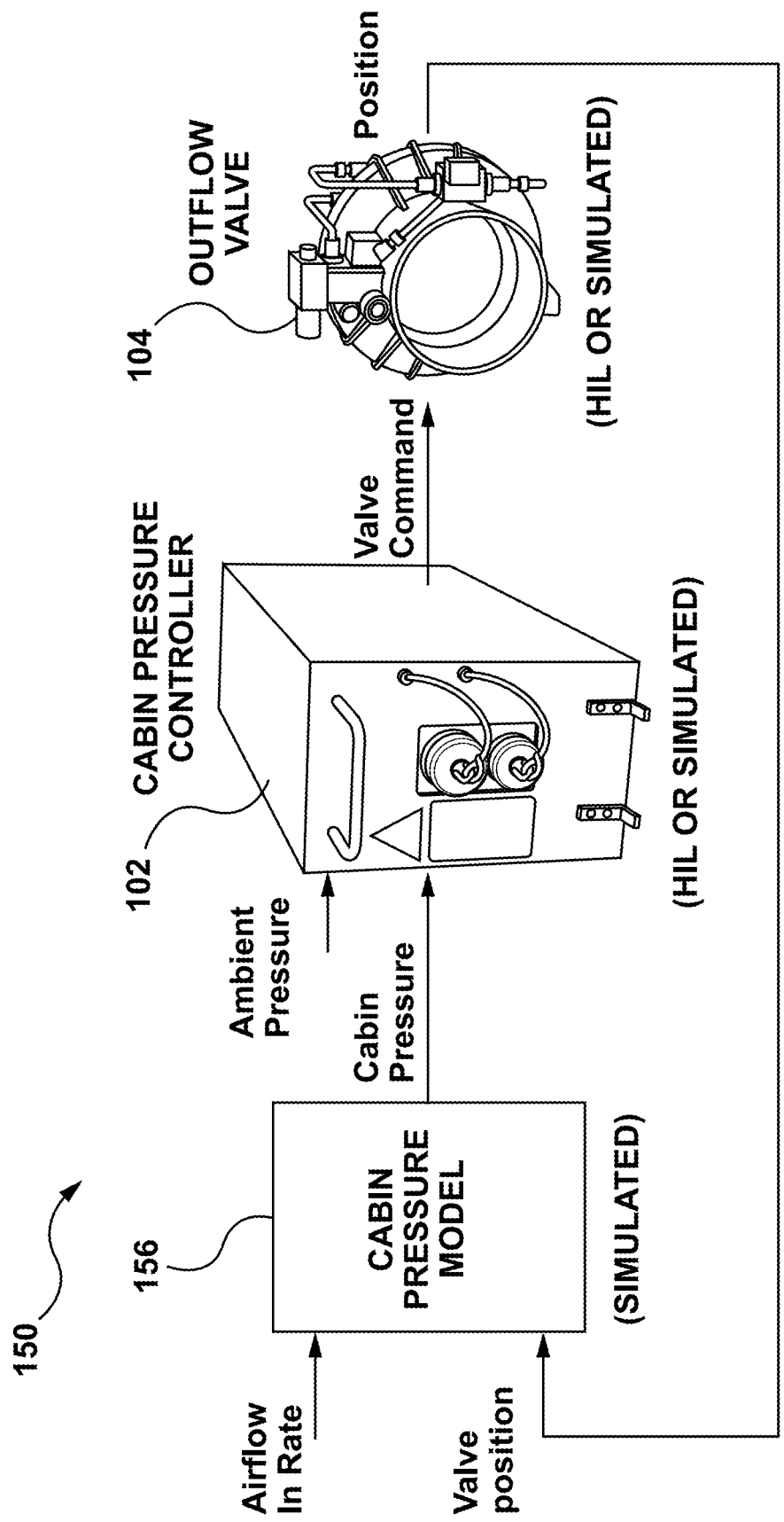
FIG. 1A is a schematic diagram graphically representing desired modes of operation of a notional test platform for testing the environmental control system of FIG. 1.

FIG. 1A is a diagram 150 graphically representing desired modes of operation of a notional test platform for testing the cabin pressure control system 100. FIG. 1A may be considered as a graphical depiction of desired functionality for the test platform that is the subject of the present description. Schematic diagram 150 illustrates the components of cabin pressure control system 100 that form part of the system under test and shows whether those components are simulated components, "hardware-in-the-loop" (HIL) components, or selectively configurable as either simulated or HIL components. The block diagram also depicts a desired model (simulation) of a physical parameter (cabin pressure) that the test platform should effect during testing and shows an example interconnection of the components.

As illustrated in FIG. 1A, the notional test platform for cabin pressure control system 100 of FIG. 1 should permit each of the cabin pressure controller 102 and outflow valve 104 to be selectively configurable as simulated or HIL components during testing. Moreover, the test platform should provide a cabin pressure model 156 that models cabin pressure based (at least partly) on two other system parameters: a current rate of airflow into the cabin ("Airflow In Rate") and a current position of the outflow valve ("Valve Position").

It should be appreciated that, since cabin pressure control system 100 of FIG. 1 does not expressly include a pressure sensor (the sensor having been omitted for simplicity of illustration), the cabin pressure model 156 of FIG. 1A should be designed to output the cabin pressure signal in electrical units. This will allow the output signal from model 156 to be fed directly to the Cabin Pressure input signal of the cabin pressure controller 102 by the test platform. If a pressure sensor had been included in the system 100 under test, it would have been interposed between the cabin pressure model 156 and the cabin pressure controller 102 in block diagram 150. In that case, the cabin pressure model 156 may instead have been designed to output a cabin pressure signal in engineering or physical units (e.g. PSI or millibars of pressure). This would allow the pressure sensor component to convert engineering units to electrical units, as is conventional. The example cabin pressure model 156 of FIG. 1A effectively collapses the pressure sensor into the model for ease of illustration.

Block diagram 150 also shows example interconnections or "notional conductors" between components 102, 104 and model 156. Each interconnection is depicted in FIG. 1A as an arrow between components. It will be appreciated that the interconnections shown in FIG. 1A represent only one possible inter-component signal mapping, but not the only possible signal mapping that the test platform should be capable of putting into effect. Indeed, the test platform should be designed to facilitate "dynamic rewiring" of the interconnections into alternative configurations or "signal mappings." For clarity, the term "dynamic rewiring" as used herein refers to setting or changing the connection, at run time, of output signals of simulated or HIL components to input signals of other simulated or HIL components, without physical manipulation of the test platform or the HIL components. For clarity, FIG. 1A adopts a convention whereby any input signal that is not connected to a source (i.e. a "hanging" input) is manually set by the test platform, using mechanisms that are described below.

FIG. 2 schematically depicts a test platform 200 for testing the cabin pressure control system 100 of FIG. 1 according to the desired modes of operation of FIG. 1A. The test platform 200 includes a test server 202 communicatively coupled to I/O circuitry 204.

The test server 202 is a computing device generally responsible for running test procedures to effect various usage scenarios of the system 100 under test, or components 102, 104 thereof, and for recording results for use in verifying proper system operation. The test server 202 also performs calculations for simulating any simulated components in a system under test. The test server 202 is illustrated in more detail in FIG. 3, described below.

The I/O circuitry 204 of FIG. 2 acts as a physical signaling interface between the test server 202 and physical components 102, 104 of the system 100 under test. The I/O circuitry 204 converts digital signals produced by the test server 202, which may have a first set of voltage and/or current characteristics, into corresponding digital or analog signals expected by the physical components 102, 104 of the system under test, which may be electrical signals having a second set of voltage and/or current characteristics distinct from the first, and vice-versa. The I/O circuitry 204 may for example be implemented using one or more commercially available data acquisition cards.

The hardware components 102, 104 of the system under test, described above, are communicatively coupled to the I/O circuitry 204 via respective interconnections 212, 214, which may for example be physical cables. The cables may be connected at physical ports or connectors in a backplane of a chassis or housing of test platform 200 (not expressly depicted in FIG. 2), which may also house test server 202 and I/O circuitry 204. The ports may have standard form factors or pinouts to facilitate convenient interconnection of different types of hardware components of different types of embedded control systems to test platform 200.

Figure 3:
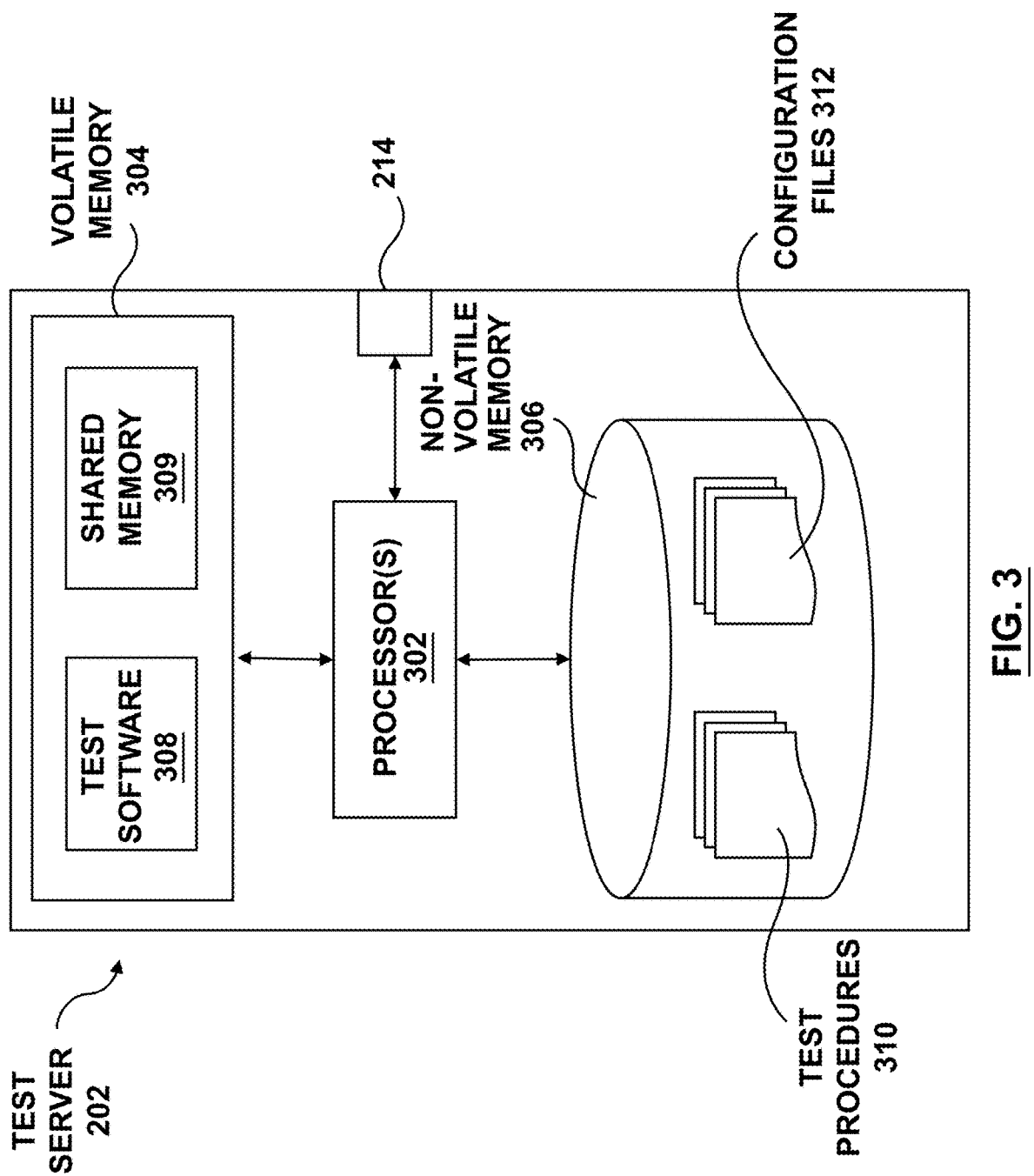
FIG. 3 is a schematic diagram depicting a test server component of the test platform of FIG. 2 in greater detail.

FIG. 3 schematically depicts the test server 202 of FIG. 2 in greater detail. The test server 202 includes one or more processors 302 in communication with volatile memory 304 and non-volatile memory 306. The processor(s) 302 is/are also communicatively coupled to a port 214, facilitating communication between the test server 202 and the I/O circuitry 204 (see FIG. 2). In some embodiments, the test server 202 may be an Intel® Server Board S4600LH2 mother board. In some embodiments, the processor(s) 302 may be (an) Intel® Xeon® E5-4669 v3 processor(s).

The volatile memory 304 of FIG. 3 may for example be RAM, e.g. with a storage capacity of 150 GB in one embodiment. During operation of the test platform 200, the volatile memory 304 stores test software 308 for execution by the processor(s) 302. The test software 308 generally governs operation of the test server 202 for testing the system under test and is illustrated in greater detail in FIG. 4, described below. Test software 308 may be loaded into the memory 304 from a tangible computer-readable medium, such as a programmable read-only memory (PROM) or other form of magnetic storage medium (not expressly depicted).

The volatile memory 304 also effects, at run time, a shared memory 309 for inter-process communication between distinct processes of test software 308. The shared memory 309 is illustrated in greater detail in FIGS. 8, 9 and 13, described below. The shared memory 309 may for example be a construct of an operating system executed by the processor(s) 302 of test server 202 during operation of test platform 200.

The non-volatile memory 306 may for example be a solid state drive, which may have a storage capacity of 1 TB for example. The non-volatile memory 306 stores multiple test procedures 310 and multiple configuration files 312.

Each test procedure 310 in non-volatile memory 306 is a set of instructions that can be interpreted by test software 308 to effect a particular usage scenario of the system 100 under test. Test procedures may for example be written to simulate changes in ambient air pressure over time and to verify that the cabin pressure control system 100 properly controls cabin pressure responsively thereto. Test procedures may also be used to manually set an input signal of a system component, such as the Airflow In Rate input signal of the cabin pressure model 156 of FIG. 1A, to a desired value at a particular time during a test, among other capabilities.

Each configuration file 312 in non-volatile memory 306 contains configuration data that specifies which of the components 102, 104 of the system under test shall be simulated, i.e. effected in software 308 by the test platform 200, and which of the components of the environmental control system shall be HIL components, i.e. hardware connected to the test platform 200. The configuration data also specifies an inter-component signal mapping of output signals to input signals between the simulated or HIL components of the system under test. The configuration data may for example be expressed in the form of markup language, which may span one or more markup language (e.g. XML) documents. Examples of two different XML configuration files 312 are illustrated in FIGS. 6 and 11, described below. In some embodiments, the configuration data may permit system components to be deemed inactive, i.e. not forming part of the system under test.

In the present embodiment, the test platform 200 is designed to allow test procedures 310 and configuration files 312 to be made independent of one another. For example, a test procedure specifying a progressively changing ambient pressure over the course of a simulation period may be executable regardless of the combination of simulated, HIL or inactive components has been specified in a currently operative configuration file. A possible benefit of this independence is that the same test procedure may be easily re-executed using different combinations of simulated/HIL/inactive components. This in turn may help to localize problems in the system under test.

Figure 4:
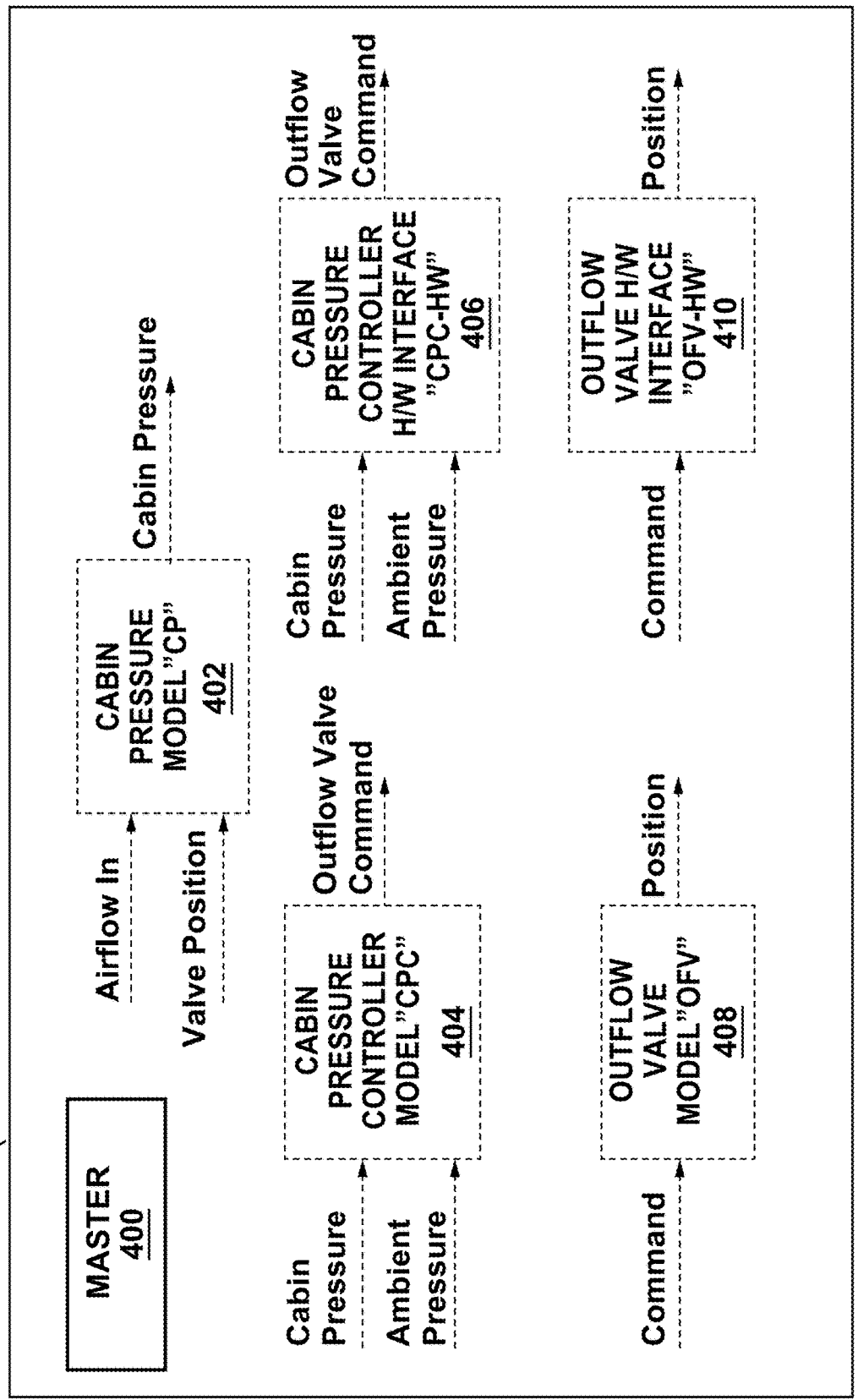
FIG. 4 is a schematic diagram depicting a test software component of the test server of FIG. 3 in greater detail.

FIG. 4 schematically depicts test software 308 of FIG. 3 in greater detail. Each block within test software 308 in FIG. 4 represents a distinct object code portion or "module" that can be independently activated at run time, e.g. as a distinct launched process. A heavy solid border denotes an object code portion that is activated every time the test software 308 is executed (e.g. master 400 of FIG. 4). A dashed border denotes object code portion that is selectively activatable (e.g. capable of being launched as a process) upon execution of the test software 308 but is presently inactive (e.g. object code portions 402, 404, 406, 408 and 410 of FIG. 4). A solid border of standard weight (not expressly shown in FIG. 4, but illustrated in FIGS. 7 and 12, described below) denotes selectively activatable object code portions that have in fact been activated during a current execution of the test software 308. Arrows pointing into a block represent input signals, and arrow pointing away from a block represent output signals.

The master module 400 is the main "engine" of the test software 308. It has three primary responsibilities. The first responsibility is to read a user-selected one of the configuration files 312 from non-volatile memory 306 and to configure the test platform 200 appropriately, by selectively activating appropriate object code portions of test software 308 for the combination of simulated/HIL/inactive components specified in the configuration file. The second responsibility of the master module 400 is to implement the inter-component signal mapping specified in the chosen configuration file. The third responsibility of the master module 400 execute a user-selected one of the test procedures 310 in non-volatile memory 306 using the system under test as configured by the currently operative configuration file 312.

Cabin pressure model 402 of FIG. 4 is an object code portion corresponding to the cabin pressure model 156 of FIG. 1A, described above.

Cabin pressure controller model 404 is an object code portion that simulates operation of the cabin pressure controller 102 of FIG. 1. It is activated by master 404 whenever the currently operative configuration file 312 specifies that the cabin pressure controller 102 is to be simulated (versus HIL). This code is responsible for generating a simulated "Valve Command" output signal based on current values of the input signals "Cabin Pressure" and "Ambient Pressure."

Cabin pressure controller hardware interface 406 is an object code portion that is activated by master 404 whenever the currently operative configuration file 312 specifies that the cabin pressure controller 102 is to be HIL (versus simulated). This code is responsible for relaying input signals "Cabin Pressure" and "Ambient Pressure" to the physical cabin pressure controller 102 via I/O circuitry 204 (see FIG. 2) and for presenting the "Valve Command" output signal from the physical cabin pressure controller 102, as relayed via the I/O circuitry 204, as output signal "Outflow Valve Command." For example, these could be supplied to the controller 102 or outflow valve 104 via a digital communications bus, or via an analog input (e.g. 4-20 mA).

Outflow valve model 408 is an object code portion that simulates operation of the outflow valve 104 of FIG. 1. It is activated by master 404 whenever the currently operative configuration file 312 specifies that the outflow valve 104 is to be simulated (versus HIL). This code is responsible for generating a simulated "Position" output signal based on a current value of the input signal "Command."

Outflow valve hardware interface 410 is an object code portion that is activated by master 404 whenever the currently operative configuration file 312 specifies that the outflow valve 104 is to be HIL (versus simulated). This code is responsible for relaying the input signal "Command" to the physical outflow valve 104 via I/O circuitry 204 (see FIG. 2) and for presenting the valve position output signal from the outflow valve 104 (e.g. an analog signal ranging between 0V-10V), as relayed via the I/O circuitry 204, as output signal "Position."

In each of the object code portions described above, input signals and output signals may be simulated using corresponding input parameters and output values, respectively.

Operation of test platform 200 occurs in two phases: a setup phase and a run phase.

Figure 5:
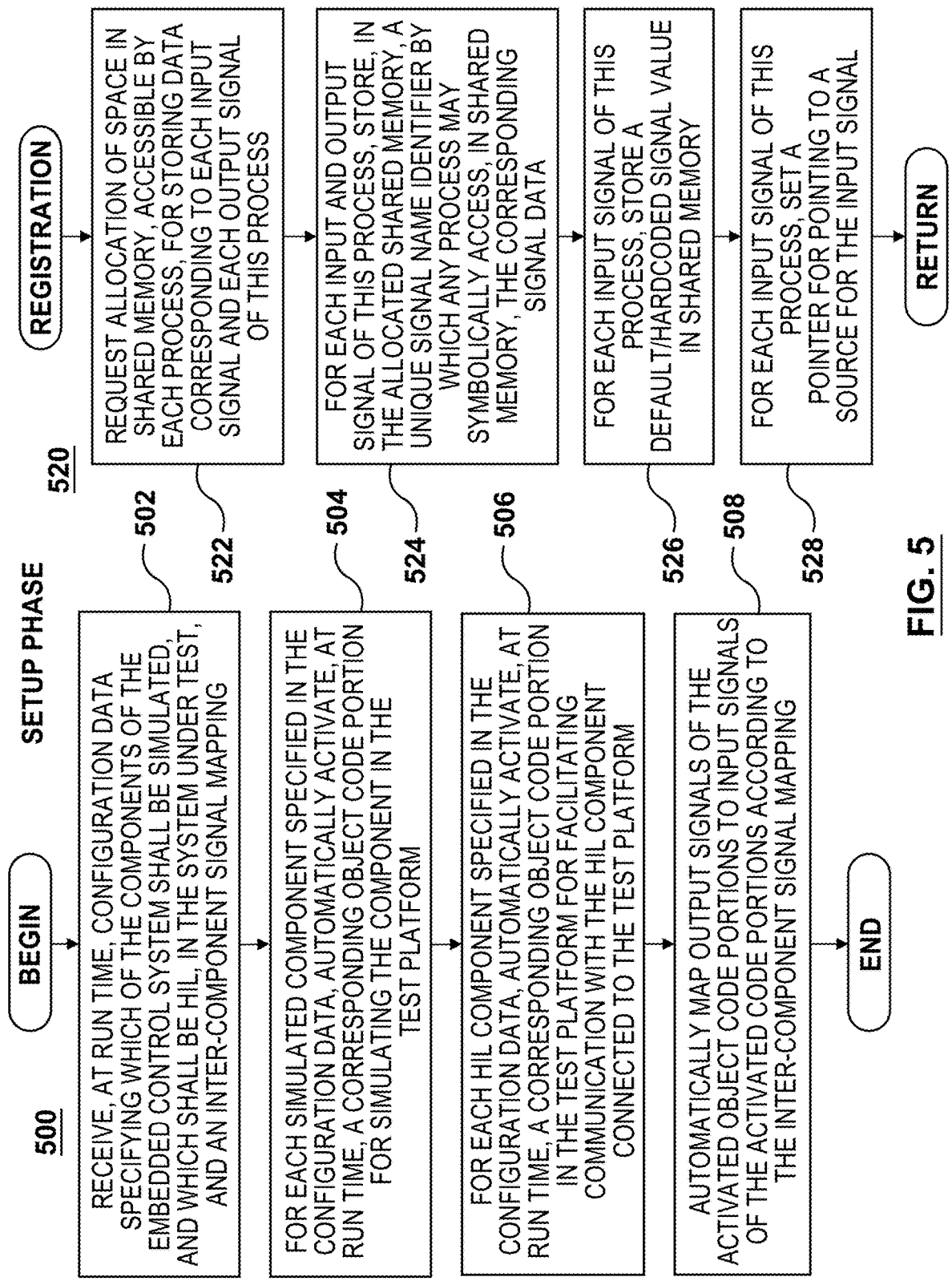
FIG. 5 is a flowchart of operation of the test platform of FIG. 2 in a setup phase of operation.

Referring to FIG. 5, the setup phase of operation 500 of the test platform 200 is depicted in flowchart form. Operation 500 may be triggered when a human operator of test platform 200 launches the test software 308 (FIG. 3) and uses a graphical user interface (not expressly depicted) to choose one of the configuration files 312 for configuring the system under test. For illustration, it is presumed that the operator has chosen the XML configuration file of FIG. 6, described below.

At the commencement of the setup phase, the test platform 200 receives, at run time, configuration data specifying which of the components of the cabin pressure control system 100 shall be simulated components in system under test and which of the components of the cabin pressure control system 100 shall be HIL components in the system under test, as well as an inter-component signal mapping (operation 502, FIG. 5). In the present embodiment, operation 502 may be performed by the master module 400 (see FIG. 4), which may read or interpret the XML configuration data from the chosen configuration file 312.

Referring to FIG. 6, an example configuration file 312 containing configuration data, expressed in XML, is textually depicted. In accordance with an operative XML schema of the present embodiment (not expressly depicted), a <Config> element (lines 4-41) contains two subordinate elements: <Processes> (lines 6-23) and <SignalMaps> (lines 25-39). The <Processes> element comprises configuration data for configuring system components as simulated, HIL, or inactive, with each subordinate <Process> element representing a single instance of a simulated or HIL component. The <SignalMaps> element defines the inter-component signal mapping between components identified in the <Processes> element, with each subordinate <SignalMap> element representing a single interconnection of an input signal to an output signal.

In the illustrated embodiment, the five XML "Process" elements defined at lines 11-12, 13-14, 15-16, 19-20, and 21-22 of FIG. 6 are associated with object code portions 402, 404, 406, 408 and 410 of FIG. 4, respectively. Here, the association is expressed using the "binary" and "modelSoPath" attributes of the respective XML elements, described below.

In the present embodiment, when an XML "Process" element associated with a simulated or HIL system component is included in the configuration data of file 312, this is interpreted to mean that the corresponding object code portion should be activated. Conversely, the absence of an XML "Process" element associated with a simulated or HIL system component from the configuration file 312 (including absence due to "commenting out" of that XML element in the configuration file 312) is interpreted to mean that the respective object code portion should not be activated. Absence of both of the simulated and HIL versions of a component from the configuration file denotes omission of that component from, i.e. inactivity of that component in, the system under test.

Based on the foregoing convention, it will be appreciated that the configuration data expressed at lines 10-22 of FIG. 6 specifies that each of cabin pressure model 156, cabin pressure controller 102 and outflow valve 104 shall be simulated in the system under test and that no components of the system 100 under test shall be HIL or inactive in the system under test.

Referring again to FIG. 5, for each simulated component specified in the configuration data of FIG. 6, the corresponding object code portion for simulating the component in the test platform 200 is activated at run time (operation 504, FIG. 5). The activation is automatic, in the sense that the test software 308, and specifically master 400 in the present embodiment, triggers it based on the chosen configuration data, without any requirement for a human operator to manually activate the object code portions at the test platform 200. For example, master module 400 may use the value of the "binary" attribute of the XML "Process" element (e.g. at line 11 of FIG. 6) to locate the object code portion, in this case at path "bin/modelharness," to be activated for operation 504, and may proceed to activate that code by launching a process to execute that code. The value of the XML attribute "modelSoPath" (e.g. at line 12 of FIG. 6) may be supplied as an input parameter, to allow the process to locate object code, in this case at path "model/CP.so," for execution during the run phase for simulating the corresponding component 156, as will be described. Analogous object code activation is performed for each of the other XML "Process" elements at lines 13-14 and 15-16 of FIG. 6 representing simulated components of the system under test.

Thereafter, for each HIL component specified in the configuration data of FIG. 6, the corresponding object code portion for facilitating communication with the HIL component connected to the test platform is automatically activated at run time (operation 506, FIG. 5). In view of the absence of any HIL components in the configuration data of FIG. 6 (bearing in mind the commented-out XML elements at lines 19-22), no object code is activated in operation 506 in the present example.

Figure 7:
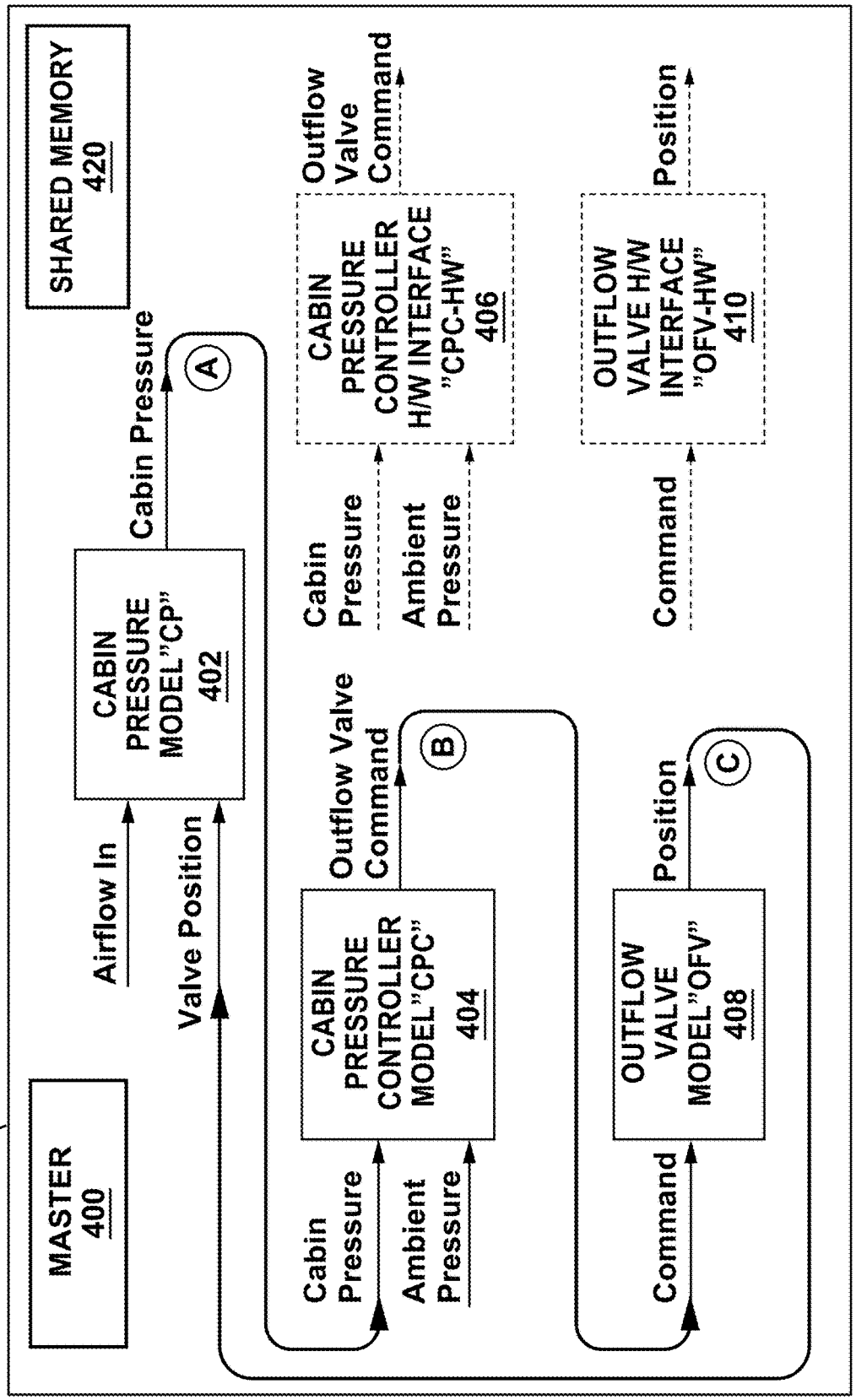
FIG. 7 is a schematic diagram depicting the test software of FIG. 4 after configuration according to the configuration file of FIG. 6.

At the conclusion of operation 506, the status of the various object code portions 402, 404, 406, 408 and 410 will be as depicted in FIG. 7: object code portions 402, 404 and 408 will be activated (as denoted by their solid borders of standard weight), while object code portions 406 and 410 will remain unactivated (as denoted by their dashed line borders).

In the present embodiment, each of the launched processes (i.e. each of the activated object code portions) initially performs a registration function in support of inter-component signal mapping to be performed subsequently in operation 508 (FIG. 5), described below. The registration function, which may be part of the bin/modelharness object code executed by each activated process in this embodiment, is represented in FIG. 5 as a "Registration" subroutine 520. Execution of the registration function for an example activated object code portion 402 of FIG. 4 (associated with the cabin pressure model 156) is described below with reference to FIG. 8, which depicts impacts upon shared memory 309.

Initially, a request is made to allocate space in shared memory 309, accessible by each process, for storing data corresponding to each input signal and each output signal of the instant process (operation 522, FIG. 5). For clarity, the input signals and output signals of a process emulate the input signals and output signals of the represented system component. The request made in operation 522 may for example be an API call to an operating system executing the test software 308 at test server 202. The identities of the input signals and output signals of the instant process may be encoded within the object code portion 402.

In response to the request, the operating system allocates shared memory segment 810 of FIG. 8. The shared memory segment 810 includes an input signal block 812 for the two input signals of cabin pressure model 156 ("Airflow In" and "Valve Position"—see FIG. 4) and an output signal block 814 for the sole output signal of cabin pressure model 156 ("Cabin Pressure"—see FIG. 4). For each input signal, sufficient space is allocated in memory for storage of: a unique symbolic name ("metadata") by which the signal may be unambiguously referenced from other processes; a default or hardcoded signal value ("local") for the signal if unconnected to a signal source; a signal source pointer ("pointer") that can be used to connect the input signal to an output signal of another component during signal mapping (described below); and a current signal value ("actual") representing the value of the input signal in the most recent frame of a test procedure during the run phase (described below). For each output signal, sufficient space is allocated for storage of: a unique symbolic name ("metadata") by which the signal may be unambiguously referenced from other processes; and a current signal value ("actual") representing the value of the output signal in the most recent frame of a test procedure during the run phase. In some embodiments, the shared memory may also store, for each input and output signal, an indication of how the signal data will be encoded in shared memory (e.g. as an IEEE 32-bit floating point value versus a fixed point value).

In a subsequent registration operation, for each input and output signal of the instant process, a unique signal name identifier, by which any process may symbolically access, in shared memory, the corresponding signal data, is stored in the appropriate place in allocated shared memory (operation 524, FIG. 5). In the case of cabin pressure model object code 402 (FIG. 4), execution of operation 524 results in the storage of unique signal name identifiers "CP.AirflowIn" in shared memory location 816, "CP.ValvePosition" in shared memory location 818, and "CP.CabinPressure" in shared memory location 832 (see FIG. 8).

In a subsequent registration operation, for each input signal of the instant process, a default and/or hardcoded signal value is stored in the appropriate place in allocated shared memory (operation 526, FIG. 5). This memory location may for example be used when a test procedure "manually" sets the value for an input signal, as will be described. In the case of cabin pressure model object code 402 (FIG. 4), execution of operation 526 results in the storage of default value "1 kgps" in each of shared memory locations 820, 822 for input signals "CP.ValvePosition" and "CP.CabinPressure" respectively (see FIG. 8).

In a final registration operation, for each input signal of the instant process, a pointer for pointing to a source for the input signal is stored in the appropriate place in allocated shared memory (operation 528, FIG. 5). In the case of cabin pressure model object code 402 (FIG. 4), execution of operation 528 sets the pointers in shared memory locations 824, 826 to point to the default signal values stored in shared memory locations 820, 822 respectively (see FIG. 8). Conceptually, this may be compared to tying the relevant input to a fixed signal source that produces the default signal value.

Upon conclusion of "Registration" subroutine 520 (FIG. 5) for the cabin pressure model object code 402, the subroutine 520 is executed again for each of the other object code portions 404, 408 (FIG. 4).

Execution of the subroutine 520 for the cabin pressure controller model object code portion 404 results in the allocation of shared memory segment 840 (FIG. 8), including an input signal block 842 for the two input signals of cabin pressure controller model 404 ("Ambient Pressure" and "Cabin Pressure"—see FIG. 4) and an output signal block 844 for the sole output signal of cabin pressure controller model 404 ("Outflow Valve Command"—see FIG. 4). Further, the values in shared memory 309 at locations 846, 848, 850, 852, 854, 856 and 862 are set as shown in FIG. 8.

Analogously, execution of the subroutine 520 for outflow valve model 408 (FIG. 4) results in the allocation of shared memory segment 870, including an input signal block 872 for the sole input signal ("Command"—see FIG. 4) and an output signal block 874 for the sole output signal ("Valve Position"—see FIG. 4). Further, the values in shared memory 309 at locations 876, 878, 880, and 884 are set as shown in FIG. 8.

Thereafter, output signals of the activated object code portions are automatically mapped to input signals of the activated code portions according to the inter-component signal mapping (operation 508, FIG. 5). In the present embodiment, this is achieved by setting pointers in shared memory to represent interconnections between output signals and input signals. More specifically, mapping of an input signal of one component (a "sink component") to an output signal of another component (a "source component") is achieved by setting the pointer associated with the input signal of the sink component to point to the shared memory location associated with the current value of the output signal of the source component.

For example, based on an interpretation of the first XML <SignalMap> element at lines 28-29 of FIG. 6 (marked with a circled A), master 400 may obtain the unique symbolic name of the output signal (the value of the fromSignal attribute, "CP.CabinPressure") and the unique symbolic name of the input signal (the value of the toSignal attribute, "CPC.CabinPressure"). The symbolic output signal name may be used to look up, in shared memory 309, the address of the memory location 834 of FIG. 8 that stores a current signal value of that output signal (note: although memory location 834 is blank in FIG. 8, it will contain a current signal value during the run phase, discussed below). Further, the symbolic input signal name may be used to look up the address of the associated pointer in shared memory 309 that points to a signal source for that input signal, i.e. memory location 856 of FIG. 8.

Figure 9:
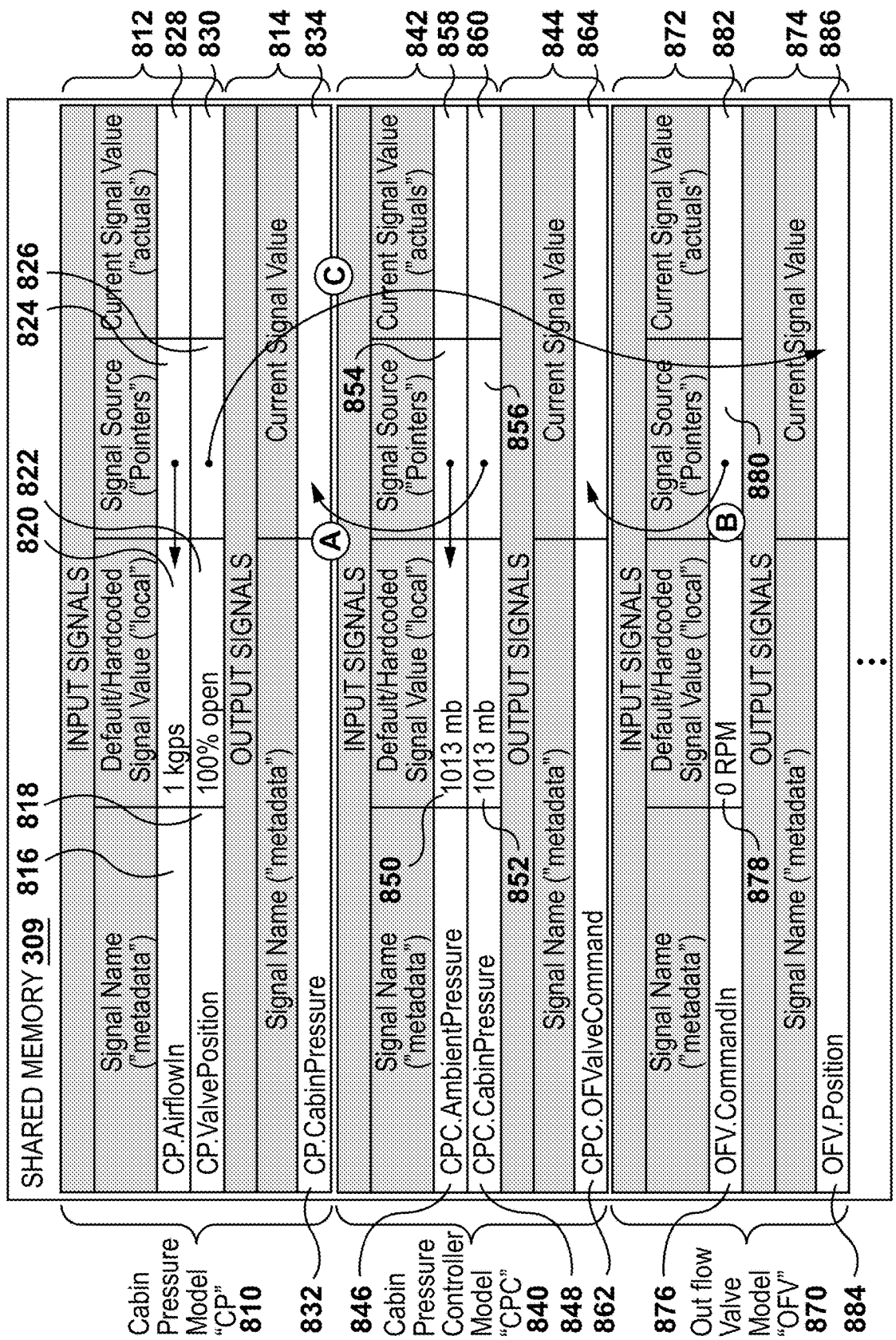
FIG. 9 is a schematic diagram of the portion of shared memory of FIG. 8 after a signal mapping operation has been performed according to the configuration file of FIG. 6.

Then, to effect the interconnection, the latter memory location 856 may be overwritten with the address of the former memory location 834. This is depicted in FIG. 9 as a resetting of the arrow pointer originating in memory location 856 to point to memory location 834 (see FIG. 9, arrow pointer marked with a circled A).

This is repeated for each of the other two signal mappings defined at lines 33-34 (marked with a circled B) and lines 37-38 (marked with a circled C) of FIG. 6. In the result, corresponding pointers (denoted in FIG. 9 with like circled letters) are written to shared memory at respective locations 880 and 826.

It will be appreciated that the signal mapping performed in operation 508 of FIG. 5 is automatic in the sense that master 400 accomplishes based on the <SignalMap> elements forming part of the configuration data, without any requirement for a human operator to manually make interconnections at the test platform 200.

Operation 500 of FIG. 5 (the setup phase) is thereby concluded.

Figure 10A:
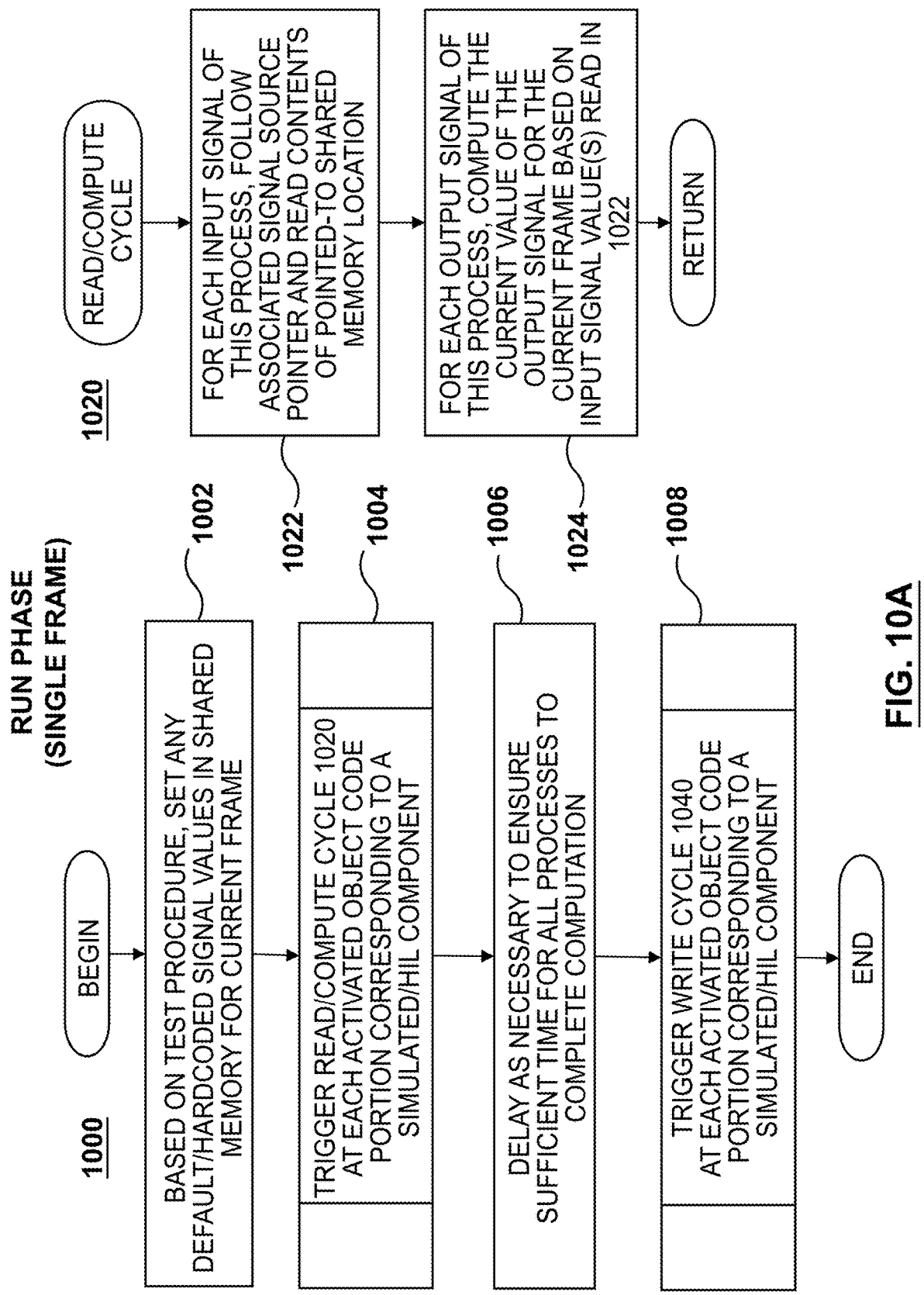
FIG. 10A and FIG. 10B are a flowchart of operation of the test platform of FIG. 2 in a run phase of operation.
Figure 10B:
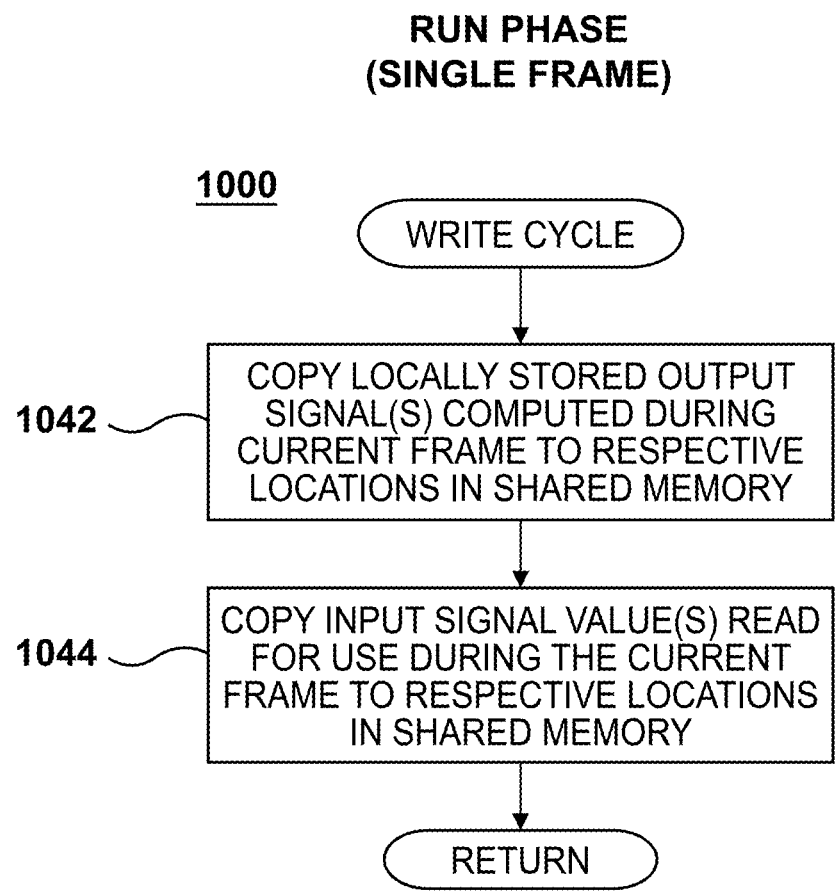

Referring to FIGS. 10A and 10B, the run phase of operation 1000 of the test platform 200 is depicted in flowchart form. In the present embodiment, the run phase comprises a series of frames. A frame may be considered as a single moment in time, or brief time interval, in the operation of the system under test. Conceptually, the operation of test platform 200 is similar to a sequential logic machine, where each frame is comparable to clock cycle and each component of the system under test is comparable to a combinational logic module that operates on a snapshot of current input signals for the current frame. Signals are passed between components only at transition points between frames based on the signal mapping defined in shared memory 309 during the setup phase (described above).

Operation 1000 of FIGS. 10 and 10B depicts operation of test platform 200 during a single frame. It will be appreciated that operation 1000 may be repeated many times during execution of a single test procedure, e.g. being triggered by master 400 once per frame. The test procedure may have been selected by a human operator via a graphical user interface of test platform 200 (not expressly depicted).

Initially, based on whatever test procedure has been chosen for execution, any default or hardcoded signal values that should be set for the current frame are set in shared memory 309 (operation 1002, FIG. 10A). For example, the test procedure may specify input signal values for any "hanging" input signals in the system under test, such as the "Airflow In Rate" signal of cabin pressure model 156 and the "Ambient Pressure" input signal to the cabin pressure controller 102 (see FIG. 1A). In the present embodiment, the master 400 effects operation 1002 by writing the values for these signals, as read from the test procedure, to the associated shared memory locations (e.g. locations 820 and 850 of FIG. 9 respectively for the two hanging input signals identified above) and by ensuring that the associated signal pointers (in memory locations 824 and 854 respectively) point to those locations.

Thereafter, a read/compute cycle is triggered at each activated object code portion corresponding to a simulated or HIL component (1004, FIG. 10). Operation 1004 is triggered by the master 400 in the present embodiment. The read/compute cycle is depicted as subroutine 1020 in FIG. 10A. It will be appreciated that the read/compute cycle 1020 is performed once by each object code portion representing a respective simulated or HIL component in the system under test as configured during the setup phase. It will further be appreciated that, although depicted as a subroutine for convenience in FIG. 10B, operation 1020 may not actually be implemented as a subroutine in a technical sense.

In a first operation of the read/compute cycle, for each input signal of the current process (activated object code portion), the associated signal source pointer in shared memory 309 is followed, and the contents of the pointed-to shared memory location are read (operation 1022, FIG. 10A). Using the activated cabin pressure controller model 404 process of FIG. 7 as an example, operation 1022 will cause the pointers in memory locations 854 and 856 of FIG. 9 (associated with input signals "CPC.AmbientPressure" and "CPC.CabinPressure" respectively) to be followed, and the contents of the pointed-to memory locations 850 and 834 respectively to be read.

Since the pointer in the first memory location 854 of FIG. 9 points to the default/hardcoded signal value of "1013 mb" for the first input signal, operation 1022 reads that value. This may be compared to receiving a preset signal value from a fixed signal source to which the relevant input signal has been notionally tied.

In contrast, since the pointer in memory location 856 for the second input signal points to the current value of output signal "CP.CabinPressure" of the (separate) cabin pressure model 156 component, operation 1022 reads the contents of shared memory location 834 (value not expressly shown in FIG. 9) in this case. This may be compared to tracing a notional conductor attached to the relevant signal input back to its source and reading the signal value at the source.

The values of both input signals read in operation 1022 are locally stored by the respective processes for use during the current frame.

In a second operation of the read/compute cycle, for each output signal of the current process (activated object code portion), the current value of the output signal is computed for the current frame based on the input signal value(s) read in operation 1022 (operation 1024, FIG. 10A). Computation in operation 1024 may for example be performed using code authored in a simulation or modeling software package such as SimuLink™ from MathWorks™ to represent the behavior of the represented system component. The computed value of the output signal for the current process is temporarily stored at each process. The read/compute cycle 1020 is thereby concluded.

In operation 1006 (FIG. 10A), the master 400 delays as necessary to ensure sufficient time for all processes (in this example, activated object code portions 402, 404, and 408 of FIG. 4) to complete the computation of their current output signal values in read/compute cycle 1020. For clarity, delays are not necessarily fixed; they may be variable, based on signals from other processes indicating completion.

Finally, a write cycle is triggered at each activated object code portion corresponding to a simulated or HIL component (operation 1008, FIG. 10A). Operation 1008 is triggered by the master 400 in the present embodiment. The write cycle is depicted as subroutine 1040 in FIG. 10B for ease of illustration. It will be appreciated that the operation 1008 may not actually be implemented as a subroutine in a technical sense.

In a first operation of the write cycle, the locally stored output signal(s) for the represented system component, as computed for the current frame, are copied to their respective locations in shared memory (operation 1042, FIG. 10B). In the present example, execution of operation 1042 at each of the activated object code portions 402, 404, and 408 of FIG. 7 would cause computed output signal values to be copied to memory locations 834, 864, and 886 of FIG. 8 respectively.

In a second operation of the write cycle, the input signal(s) whose value(s) were read in operation 1022 for use during the current frame are copied to respective locations in shared memory (operation 1044, FIG. 10B). In the present example, execution of operation 1044 at each of the activated object code portions 402, 404, and 408 of FIG. 7 would cause input signal values to be copied to memory locations 828, 830, 858, 860 and 882. The values may be written to these shared memory locations for logging purposes, to conveniently produce a record of the input signal values used for each frame. The write cycle 1040 of FIG. 10B is thereby concluded.

Once execution of a test procedure has been completed through repeated execution of operation 1000 of FIG. 10A, the test platform 200 may be easily reconfigured to provide a different combination of simulated/HIL components. This is achieved simply through provision of new configuration data. In the present embodiment, a human operator may simply select a new configuration file 312 from non-volatile memory 306 using a suitable graphical user interface of the test platform 200 (not depicted).

FIG. 11 depicts an alternative configuration file that may be used to reconfigure the test platform 200 to use HIL versions of system components 102 and 104 of FIG. 1 rather than simulated versions of those components as specified in FIG. 6. The format of FIG. 11 follows that of FIG. 6. Several differences from the configuration data of FIG. 6 are notable.

Firstly, the two <Process> elements defined at lines 13-16, which are associated with cabin pressure controller model 404 and outflow valve model 408 (representing simulations of respective system components 102 and 104 of FIG. 1) have been commented out. The reason is that these simulations will be unnecessary for the desired system configuration.

Secondly, the two <Process> elements defined at lines 19-20 and 21-22, which are associated with cabin pressure controller hardware interface 406 and outflow valve hardware 30 interface 410, have been uncommented. These object code portions will support intercommunication with the actual hardware versions of these components during testing.

Based on the conventions described earlier in connection with FIG. 6, it will be appreciated that the configuration data expressed at lines 10-22 of FIG. 11 specifies that cabin pressure model 156 shall be simulated and that each of cabin pressure controller 102 and outflow valve 104 shall be HIL in the system under test.

Thirdly, the <SignalMaps> element at lines 35-38 of FIG. 11 differs from that of FIG. 6 in that signals are mapped between the simulated/HIL components specified in the <Processes> element at lines 6-23 instead of the purely simulated components specified in the <Processes> element of FIG. 6.

Figure 12:
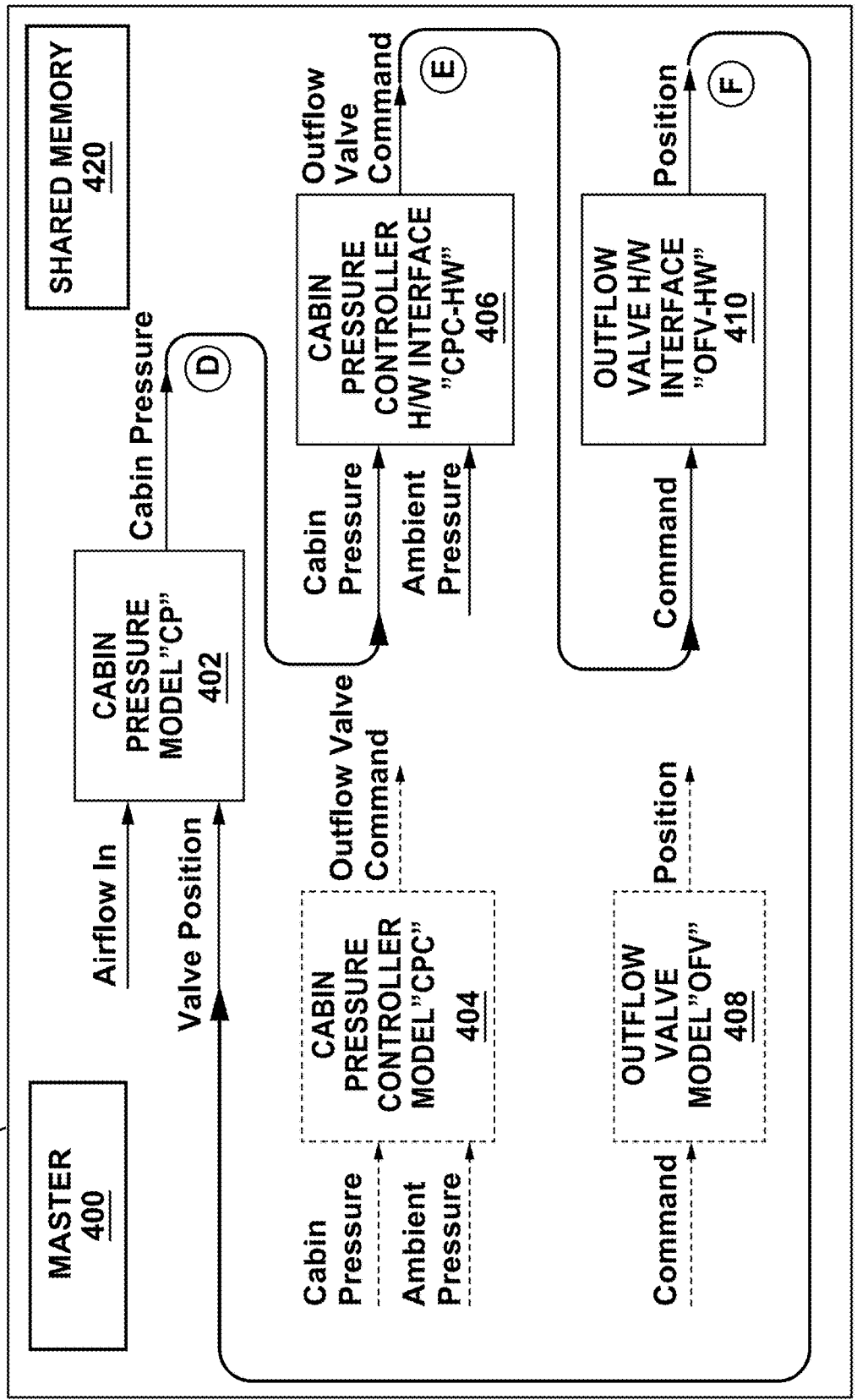
FIG. 12 is a schematic diagram depicting the test software of FIG. 4 after configuration according to the configuration file of FIG. 11.
Figure 13:
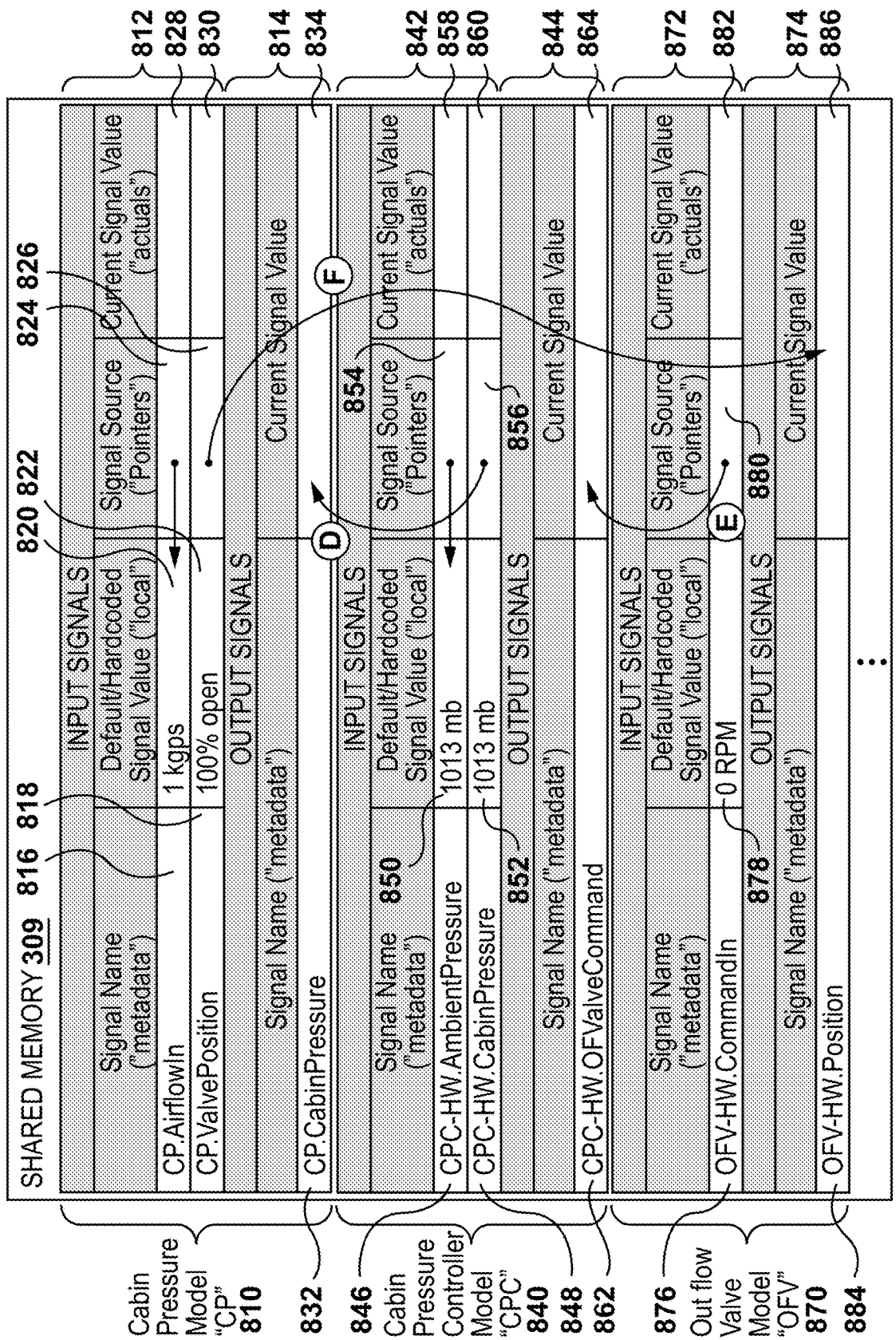
FIG. 13 is a schematic diagram depicting the portion of shared memory of FIG. 8 after a signal mapping operation has been performed according to the configuration file of FIG. 11.

When the setup phase of operation of the test platform 200 (operation 500 of FIG. 5) is performed using the configuration file depicted in FIG. 11, operations 504 and 506 of FIG. 5 will result in the activation of object code portions 402, 406 and 410, as shown in FIG. 12. Notably, the object code portions 404, 408 previously activated for the configuration file of FIG. 6 will no longer be activated. Further, operation 508 of FIG. 5 will cause pointers denoted with encircled letters D, E, and F to be set in shared memory 309 as shown in FIG. 13, in accordance with the signal mapping configuration data expressed at lines 28-29, 32-33, and 36-37 respectively of FIG. 11.

At the conclusion of operation 500 of FIG. 5, the system under test will have been reconfigured as desired without any need to physically manipulate connections at the test platform 200 or to recompile or relink test software 308. Conveniently, re-execution of operation 1000 during the run phase will be as effective for the new configuration shown in FIG. 12 as it was for the configuration shown in FIG. 7. Notably, operation 1022 for a HIL component will entail passing of input signals to the relevant hardware component 102 or 104, and the receiving output signals therefrom, via I/O circuitry 204 (FIG. 3).

It will be appreciated that, if either of the system components 102, 104 is simulated for a particular configuration file, the corresponding hardware components 102, 104 may conveniently remain connected to the test platform 200 but will simply be unused. This may avoid the need to physically manipulate the test platform 200 between test runs.

For clarity, regarding notation used in the drawings, it will be appreciated that the arrows labeled with an encircled A, B or C in FIG. 7 and those labeled with an encircled D, E, or F in FIG. 12 point in direction of data flow. In contrast, the arrows in FIGS. 9 and 13, which are similarly labeled, represent shared memory addresses, i.e. are pointers.

To re-execute the same test procedure using a different combination of simulated/HIL components, the test software 308 may be invoked at test platform 200 using a different configuration file. Presuming that the test procedure stimulates only input signals whose names do not change regardless of what combination of simulated/HIL components is used (e.g. the CP.AirflowIn input signal 816 of FIGS. 9 and 13), the same test procedure can be re-executed. In that case, the stimulation of input signals may be achieved by setting the corresponding Default/Hardcoded Signal Values for the relevant input signals (e.g. in the case of the CP.AirflowIn input signal referenced above, by writing to shared memory location 820 of FIG. 9 or 13) and by ensuring that the signal source pointer associated with that input signal (in this example, the signal source pointer in shared memory location 824) points to the Default/Hardcoded Signal Value as set.

Various alternative embodiments are possible.

In the environment described above, configuration data was expressed in XML. Configuration data may be specified in other ways in alternative embodiments, e.g. using other markup languages, textually, proprietary binary formats, databases, or otherwise.

It will be appreciated that, although the description and figures referenced above may specifically refer to "processes" (e.g. at operations 522-528 of FIG. 5), the processes are merely examples of activated object code portions. Alternative embodiments may activate object code portions in other ways besides as processes, e.g. as instantiated objects, as dynamically linked or loaded code, as Shared Objects in Linux™, or DLLs in Windows™.

Fundamentally, the test platform described herein is not necessarily limited to testing environmental control systems. The test platform could be used to test any embedded control system having a plurality of interconnected components.

What is claimed is:
1. A method of configuring a test platform for testing an embedded control system having a plurality of interconnected components, the method comprising:
    receiving, at run time, configuration data for configuring a system under test representing the embedded control system, the configuration data specifying:
        which of the components of the embedded control system shall be simulated components in the system under test and which of the components of the embedded control system shall be hardware-in-the-loop (HIL) components, connected to the test platform, in the system under test; and
        an inter-component signal mapping that maps input signals of the specified simulated or HIL components of the system under test to output signals of the specified simulated or HIL components of the system under test;

for each of the simulated components in the system under test, automatically activating, at run time, a corresponding object code portion for simulating the embedded system component in the test platform;

for each of the HIL components in the system under test, automatically activating, at run time, a corresponding object code portion in the test platform for facilitating communication with the HIL component connected to the test platform; and automatically mapping input signals of the activated object code portions to output signals of the activated code portions according to the inter-component signal mapping.

2. The method of claim 1 wherein the configuration data is expressed using a markup language.

3. The method of claim 1 wherein the inter-component signal mapping includes at least one mapping of an input signal of one of the simulated or HIL components of the system under test to an output signal of another one of the simulated or HIL components of the system under test and wherein the automatically mapping comprises setting a pointer associated with the input signal of the one component to point to a shared memory location associated with the output signal of the other component.

4. The method of claim 3 wherein the object code portion corresponding to the one simulated or HIL component, upon execution, causes the test platform, during a read cycle of a frame, to use the pointer to read, from the shared memory location associated with the output signal of the other simulated or HIL component, the current value of the output signal.

5. The method of claim 4 wherein the object code portion corresponding to the other simulated or HIL component, upon execution, causes the test platform, during a write cycle of the frame, to write the current value of the output signal to the shared memory location.

6. The method of claim 1 further comprising further receiving, at run time, a test procedure for exercising a usage scenario of the system under test regardless of the combination of simulated components and HIL components in the system under test specified by the configuration data.

7. The method of claim 1 wherein the embedded control system is a cabin pressure control system and wherein the components include at least one pressure sensor, at least one valve, and at least one cabin pressure controller.

8. A test platform for testing an embedded control system having a plurality of interconnected components, the test platform comprising:
a computing device including:
at least one hardware processor;
memory, in communication with the at least one processor, storing instructions that, upon execution, cause the at least one processor to:
receive, at run time, configuration data for configuring a system under test representing the embedded control system, the configuration data specifying:
which of the components of the embedded control system shall be simulated components in the system under test and which of the components of the embedded control system shall be hardware-in-the-loop (HIL) components, connected to the test platform, in the system under test; and an inter-component signal mapping that maps input signals of the specified simulated or HIL components of the system under test to output signals of the specified simulated or HIL components of the system under test;

for each of the simulated components in the system under test, automatically activate, at run time, a corresponding object code portion for simulating the embedded system component in the test platform;

for each of the HIL components in the system under test, automatically activate, at run time, a corresponding object code portion in the test platform for facilitating communication with the HIL component connected to the test platform; and automatically map input signals of the activated object code portions to output signals of the activated code portions according to the inter-component signal mapping.

9. The test platform of claim 8 wherein the memory includes a shared memory accessible at run time to all of the activated object code portions, wherein the inter-component signal mapping includes at least one mapping of an input signal of one of the simulated or HIL components of the system under test to an output signal of another one of the simulated or HIL components of the system under test, and wherein the automatically mapping comprises setting a pointer associated with the input signal of the one component to point to a shared memory location associated with the output signal of the other component.

10. The test platform of claim 9 wherein the object code portion corresponding to the one simulated or HIL component, upon execution, causes the test platform, during a read cycle of a frame, to use the pointer to read, from the shared memory location associated with the output signal of the other simulated or HIL component, the current value of the output signal.

11. The test platform of claim 10 wherein the object code portion corresponding to the other simulated or HIL component, upon execution, causes the test platform, during a write cycle of the frame, to write the current value of the output signal to the shared memory location.

12. A non-transitory computer-readable medium storing instructions for configuring a test platform for testing an embedded control system having a plurality of interconnected components, the instructions, when executed by at least one processor of the test platform, causing the at least one processor to:
receive, at run time, configuration data for configuring a system under test representing the embedded control system, the configuration data specifying:
which of the components of the embedded control system shall be simulated components in the system under test and which of the components of the embedded control system shall be hardware-in-the-loop (HIL) components, connected to the test platform, in the system under test; and
an inter-component signal mapping that maps input signals of the specified simulated or HIL components of the system under test to output signals of the specified simulated or HIL components of the system under test;

for each of the simulated components in the system under test, automatically activate, at run time, a corresponding object code portion for simulating the embedded system component in the test platform;

for each of the HIL components in the system under test, automatically activate, at run time, a corresponding object code portion in the test platform for facilitating communication with the HIL component connected to the test platform; and automatically map input signals of the activated object code portions to output signals of the activated code portions according to the inter-component signal mapping.

13. The non-transitory computer readable medium of claim 12 wherein the configuration data is expressed using a markup language.

14. The non-transitory computer readable medium of claim 12 wherein the inter-component signal mapping includes at least one mapping of an input signal of one of the simulated or HIL components of the system under test to an output signal of another one of the simulated or HIL components of the system under test and wherein the automatically mapping comprises setting a pointer associated with the input signal of the one component to point to a shared memory location associated with the output signal of the other component.

15. The non-transitory computer readable medium of claim 14 wherein the object code portion corresponding to the one simulated or HIL component, upon execution by the at least one processor, causes the test platform, during a read cycle of a frame, to use the pointer to read, from the shared memory location associated with the output signal of the other simulated or HIL component, the current value of the output signal.

16. The non-transitory computer readable medium of claim 15 wherein the object code portion corresponding to the other simulated or HIL component, upon execution by the at least one processor, causes the test platform, during a write cycle of the frame, to write the current value of the output signal to the shared memory location.

17. The non-transitory computer readable medium of claim 12 wherein the instructions, when executed by the at least one processor of the test platform, further cause the test platform to:

further receive, at run time, a test procedure for exercising a usage scenario of the system under test regardless of the combination of simulated components and HIL components in the system under test specified by the configuration data.

18. The non-transitory computer readable medium of claim 12 wherein the embedded control system is a cabin pressure control system and wherein the components include at least one pressure sensor, at least one valve, and at least one cabin pressure controller.

* * * * *